(12) United States Patent
Zhang et al.

(10) Patent No.: US 12,207,241 B2
(45) Date of Patent: Jan. 21, 2025

(54) WIRELESS COMMUNICATIONS DEVICE

(71) Applicant: NXP USA, Inc., Austin, TX (US)

(72) Inventors: Hongyuan Zhang, Fremont, CA (US); Sudhir Srinivasa, Los Gatos, CA (US); Ken Kinwah Ho, San Jose, CA (US); Timothy J. Donovan, Carmel, CA (US); Foo Keong Tang, San Jose, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 275 days.

(21) Appl. No.: 17/655,979

(22) Filed: Mar. 22, 2022

(65) Prior Publication Data

US 2023/0309068 A1    Sep. 28, 2023

(51) Int. Cl.
*H04W 72/04* (2023.01)
*H04W 72/0446* (2023.01)
*H04W 72/23* (2023.01)
*H04W 84/12* (2009.01)
*H04W 88/08* (2009.01)

(52) U.S. Cl.
CPC ....... *H04W 72/0446* (2013.01); *H04W 72/23* (2023.01); *H04W 84/12* (2013.01); *H04W 88/08* (2013.01)

(58) Field of Classification Search
CPC .......... H04W 72/0446; H04W 72/042; H04W 72/23; H04W 84/12; H04W 88/08
See application file for complete search history.

(56) References Cited

U.S. PATENT DOCUMENTS

| | | |
|---|---|---|
| 2010/0309871 A1 | 12/2010 | Fischer et al. |
| 2014/0219284 A1 | 8/2014 | Chau et al. |
| 2016/0330753 A1* | 11/2016 | Jauh ................... H04W 28/065 |
| 2017/0041961 A1 | 2/2017 | Zou et al. |
| 2017/0064708 A1* | 3/2017 | Noh ...................... H04L 5/0023 |
| 2017/0195107 A1* | 7/2017 | Liu ...................... H04L 27/2602 |
| 2017/0244769 A1 | 8/2017 | Cauduro Dias de Paiva et al. |
| 2018/0027453 A1* | 1/2018 | Viger ................ H04W 74/0816 |
| | | 370/336 |

(Continued)

FOREIGN PATENT DOCUMENTS

WO    WO-2020160774 A1    8/2020

OTHER PUBLICATIONS

Huang, Po-Kai et al., Intel; "MU-RTS/CTS for DL MU"; Document IEEE 802.11-15/0867r1; 24 pages (Jul. 14, 2015).

(Continued)

*Primary Examiner* — Derrick V Rose

(57) ABSTRACT

One example discloses a wireless Access Point (AP) device, within a wireless local area network (WLAN), including: a controller configured to generate a reserve slot time trigger frame to a selected set of wireless devices; wherein the controller is configured to be coupled to an antenna; wherein the antenna is configured to transmit the reserve slot time trigger frame over a physical media to the selected set of user station devices (STAs) and exchange traffic with the selected set of STAs over the physical media; wherein the reserve slot time trigger frame is configured to reserve a slot time on the physical media; and wherein the controller is configured to transmit a burst of downlink (DL) traffic from the AP device during the slot time.

20 Claims, 11 Drawing Sheets

(56) References Cited

U.S. PATENT DOCUMENTS

| | | |
|---|---|---|
| 2018/0279368 A1 | 9/2018 | Butt et al. |
| 2019/0053275 A1* | 2/2019 | Lanante et al. |
| 2020/0068563 A1* | 2/2020 | Wu ...................... H04W 72/21 |
| 2020/0120711 A1* | 4/2020 | Sevin ...................... H04L 5/001 |

OTHER PUBLICATIONS

Kwon, Young Hoon et al, Newracom; "Protection Using MU-RTS/CTS"; Document IEEE 802.11-16/0048r0; 11 pages (Jan. 18, 2016).
U.S. Appl. No. 17/655,987, filed Mar. 22, 2022; 49 pages.
U.S. Appl. No. 17/655,987; Non-Final Office Action mailed Mar. 27, 2024; 19 pages.
U.S. Appl. No. 17/655,987; Notice of Allowance mailed Aug. 7, 2024; 10 pages.

* cited by examiner

WIRELESS COMMUNICATIONS DEVICE

The present specification relates to systems, methods, apparatuses, devices, articles of manufacture and instructions for wireless communications.

SUMMARY

According to an example embodiment, a wireless Access Point (AP) device, within a wireless local area network (WLAN), comprising: a controller configured to generate a reserve slot time trigger frame to a selected set of wireless devices; wherein the controller is configured to be coupled to an antenna; wherein the antenna is configured to transmit the reserve slot time trigger frame over a physical media to the selected set of user station devices (STAs) and exchange traffic with the selected set of STAs over the physical media; wherein the reserve slot time trigger frame is configured to reserve a slot time on the physical media; and wherein the controller is configured to transmit a burst of downlink (DL) traffic from the AP device during the slot time.

In another example embodiment, the reserve slot time trigger frame is a MU_RTS trigger frame compatible with an IEEE802.11ax standard.

In another example embodiment, the slot time is a TXOP slot time compatible with an IEEE802.11ax standard.

In another example embodiment, the DL traffic includes a set of data packets separately addressed to the selected STAs.

In another example embodiment, the controller configured to transmit a configuration frame to configure the selected set of STAs; the configuration frame includes an UL backoff time field for scheduling a particular time for UL traffic to be transmitted by each one of the selected STAs; and the backoff time field includes an arbitration inter-frame spacing (AIFS) time and a random backoff time.

In another example embodiment, the random backoff time is set to zero.

In another example embodiment, the controller is configured to set a fixed AIFS time unique to each of the selected STAs.

In another example embodiment, the controller is configured to set the AIFS time for each of the selected STAs independent of a traffic type.

In another example embodiment, the selected set of STAs include a first STA and a second STA; the controller configured to transmit a configuration frame to configure the selected set of STAs; and the configuration frame assigns a first time to transmit uplink (UL) traffic to the first STA and a second time to transmit UL traffic to the second STA.

In another example embodiment, the first time is different from the second time.

In another example embodiment, the first and second times are calculated based on a trigger event received from one of the selected STAs.

In another example embodiment, the first and second times are calculated based on an earliest trigger event from a set of trigger events received from the selected STAs.

In another example embodiment, the first and second times are calculated based on a trigger event sent by one of the selected STAs during the slot time.

In another example embodiment, the DL traffic to each of the selected STAs is spaced by a time that is less than either an IEEE802.11ax standard contention period or SIFS period.

In another example embodiment, the UL traffic from to each of the selected STAs is spaced by a time that is less than either an IEEE802.11ax standard contention period or SIFS period.

In another example embodiment, the antenna is configured to transmit the reserve slot time trigger frame to an additional set of STAs and exchange traffic with the additional set of STAs; and the controller configured to exchange traffic with the additional set of wireless devices outside of the slot time.

In another example embodiment, the AP device is a software defined access point (Soft-AP) embedded within a computer or microcontroller.

In another example embodiment, the reserve slot time trigger frame is a request to send trigger frame (MU_RTS).

According to an example embodiment, a method of enabling a wireless Access Point (AP) device within a wireless local area network (WLAN) to be operated, comprising: distributing a set of instructions, stored on a non-transitory, tangible computer readable storage medium, for configuring the wireless communications device; wherein the instructions include: generating a reserve slot time trigger frame to a selected set of wireless devices; transmitting the reserve slot time trigger frame over a physical media to the selected set of user station devices (STAs) and exchanging traffic with the selected set of STAs over the physical media; wherein the reserve slot time trigger frame is configured to reserve a slot time on the physical media; and wherein the controller is configured to transmit a burst of downlink (DL) traffic from the AP device during the slot time.

In another example embodiment, the selected STAs are responsive to a manually configured UL backoff time field for scheduling a particular time for UL traffic to be transmitted by each one of the selected STAs; and the backoff time field includes an arbitration inter-frame spacing (AIFS) time and a random backoff time.

In another example embodiment, the selected set of STAs include a first STA and a second STA; and the selected STAs include a manually configured first time to transmit uplink (UL) traffic to the first STA and a manually configured second time to transmit UL traffic to the second STA.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
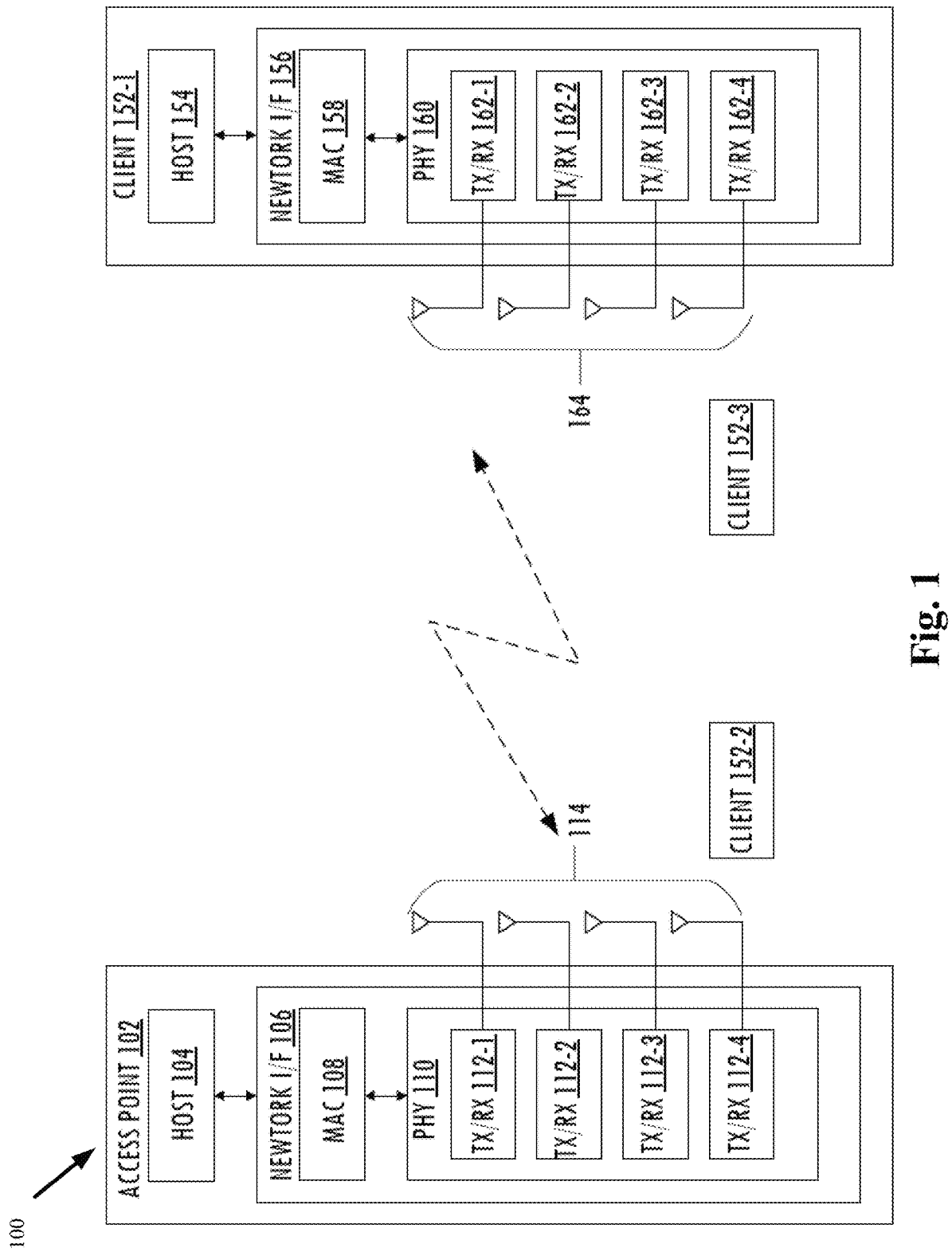
FIG. 1 represents an example wireless communications network (WLAN) formed by a set of wireless communications devices (i.e. APs and STAs).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth]. In various example embodiments, one or more APs may be affiliated into a logical AP group and/or one or more STAs may be affiliated into a logical STA group. SU and MU may refer to an AP, a STA, a set of APs and/or a set of STAs.

FIG. 1 represents an example 100 wireless communications network (WLAN) formed by a set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor/controller 108 and physical layer (PHY) processor/controller 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs.

MU Uplink (UL) and downlink (DL) OFDMA were first introduced in the IEEE802.11ax (i.e. 11ax) standard. In 11ax, an access point (AP) allocates different groups of OFDM tones (or resource units-RU) to different users/stations (STAs), so that data to or from multiple STAs may be delivered together in the same frame/packet.

MU-OFDMA does not increase the overall PHY-layer data rate, compared with conventional single user SU-OFDAM schemes; however, MU-OFDMA improves airtime efficiency—e.g. reduces the airtime due to individual STA channel contention, backoff, or the overhead caused by PHY preamble, or MAC frame exchanges. Any improvements in airtime efficiency translates to UL & DL latency reductions for between the various users (e.g AP and STAs).

Figure 2A:
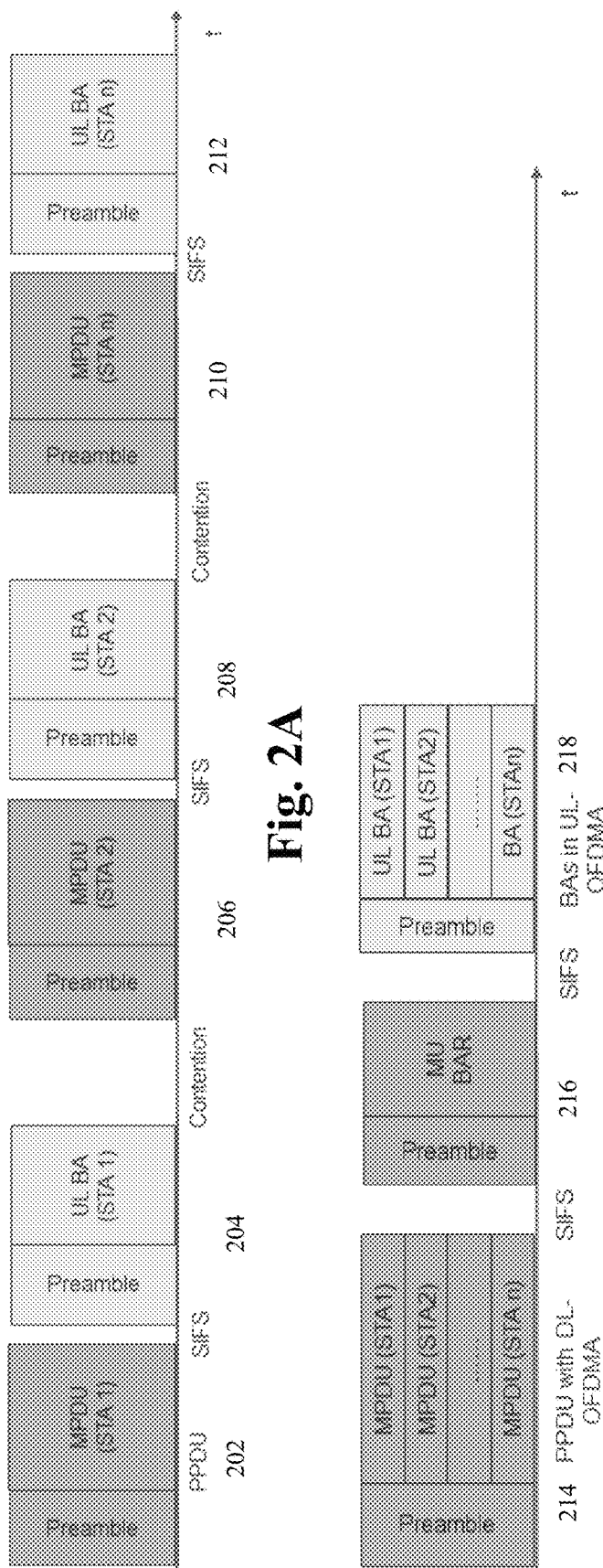
FIG. 2A represents an example timing diagram of a SU-OFDMA (DL or UL) airtime requirement.

FIG. 2A represents an example timing diagram of a SU (DL or UL) airtime requirement. Shown is an AP to STA1 DL data block frame 202, a SIFS (short inter-frame space) time, a STA1 to AP UL data BA (block acknowledgement) frame 204, a contention time, an AP to STA2 DL data block frame 206, another SIFS time, a STA2 to AP UL data BA (block acknowledgement) frame 208, another contention time, an AP to STAn DL data block frame 210, an additional SIFS time, and a STAn to AP UL data BA (block acknowledgement) frame 212.

During the 11ax contention time any collision or yield to other STA's transmissions introduces longer latency for various other UL or DL transmissions from other STAs.

Thus channel contentions either inside a BSS or across overlapping BSSs (OBSS), different STAs and APs needing to transmit SU packets, will also have their own random backoff time in case two transmissions collide, resulting in significant increases in transmission latency.

Figure 2B:
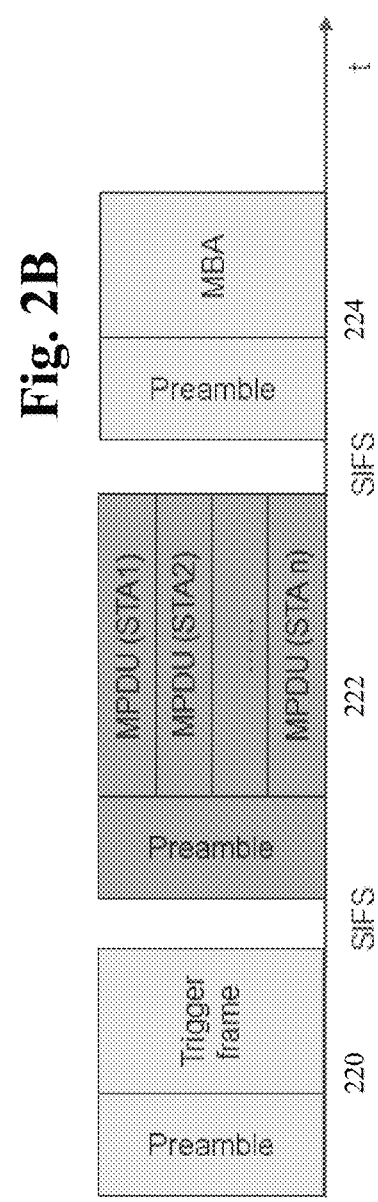
FIG. 2B represents an example timing diagram of a DL MU-OFDMA airtime requirement.

FIG. 2B represents an example timing diagram of a DL MU-OFDMA airtime requirement. Shown is an AP to STA1, STA2 . . . STAn UL multi-user data block frame 214, an SIFS time, an AP to STA1, STA2 . . . STAn UL multi-user BAR (block acknowledgement request) frame 216, another SIFS time, and a STA1, STA2 . . . STAn to AP BA (block acknowledgement) frame 218. Clearly such 11ax MU DL has a shorter airtime and reduced latency as compared to the SU in FIG. 2A.

Figure 2C:
FIG. 2C represents an example timing diagram of an UL MU-OFDMA airtime requirement.

FIG. 2C represents an example timing diagram of an UL MU-OFDMA airtime requirement. Shown is a STA1, STA2 . . . STAn to AP data UL trigger frame 220, an SIFS time, an AP to STA1, STA2 . . . STAn UL multi-user data block frame 222, another SIFS time, and a STA1, STA2 . . . STAn to AP MBA (multi-user BAR (block acknowledgement request) frame 224. Again such 11ax MU UL has a shorter airtime and reduced latency as compared to the SU in FIG. 2A.

Now discussed are example embodiments of a partial IEEE802.11ax MU-OFDMA message exchange that has a shorter airtime and reduced latency in a way similar to what fully compliant (i.e. true) IEEE802.11ax MU-OFDMA can achieve. This partial 11ax messaging is particularly applicable to cost constrained devices that use Soft-APs (aka. mobile APs, micro-APs, virtual router, etc.) attempting to enable MU-OFDMA. A SoftAP is a software defined access point that is typically generated in a generic device (e.g. computer, smartphone, etc.) that is not a dedicated AP device.

This partial IEEE802.11ax MU-OFDMA message exchange includes sending an 11ax MU-RTS trigger frame to a selected set of STAs (e.g. STA1, STA2, STA3 and STA4) to reserve a physical media for these selected STAs against either or both BSS (inside basic service set) STAs and/or OBSS (outside BSS) STAs. This both reduces a chance of collision, and reduces channel contention overhead time. This partial IEEE802.11ax MU-OFDMA message exchange also uses IEEE802.11ax AIFS to permit the selected set of STAs to burst a set of UL traffic to the AP device. Various example embodiments of the partial IEEE802.11ax MU-OFDMA message exchange are discussed below.

Figure 3:
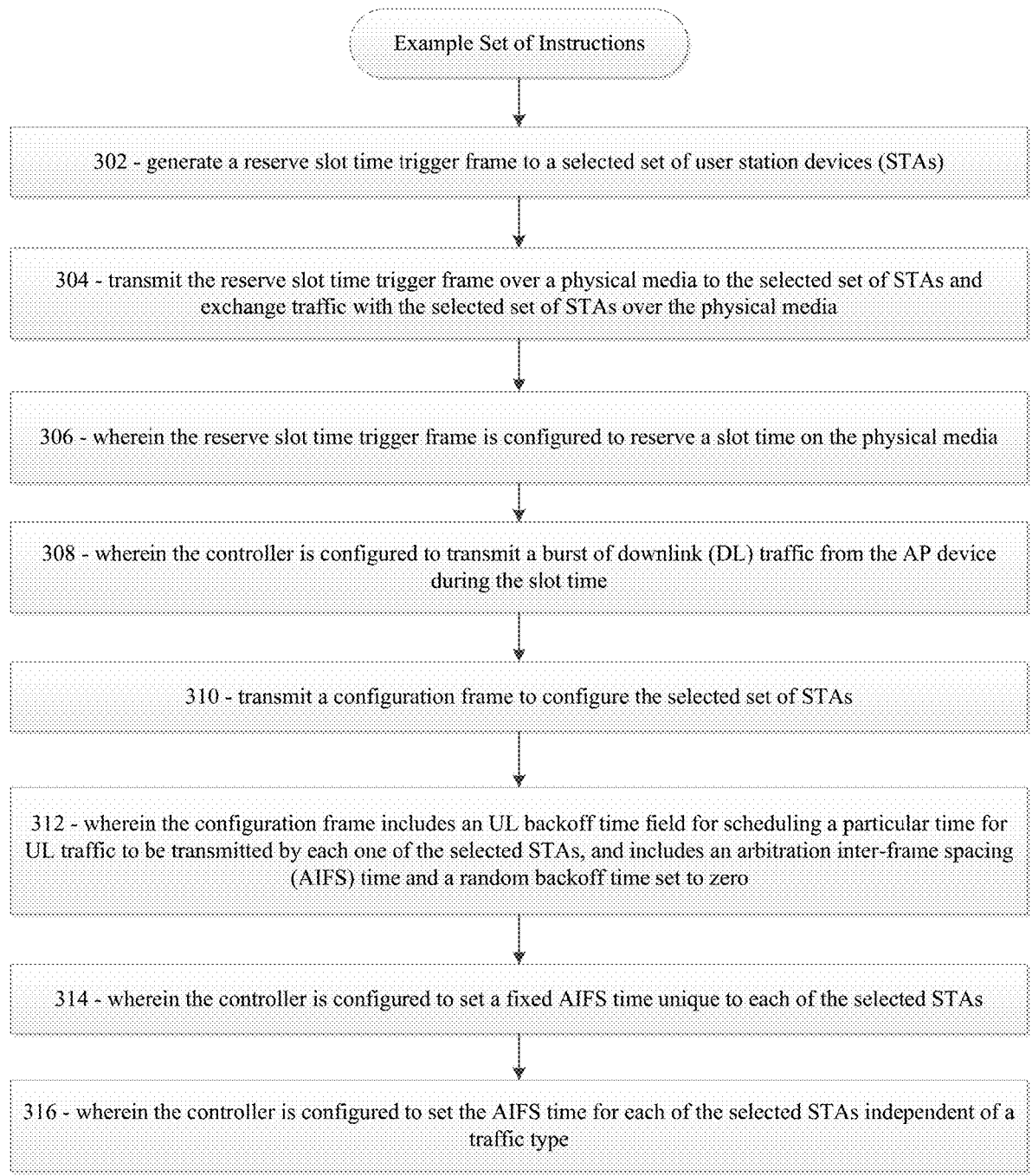
FIG. 3 represents an example set of overall instructions for enabling an AP device to perform partial IEEE802.11ax MU-OFDMA message exchanges.

FIG. 3 is an example set of overall instructions for enabling an AP device to perform partial IEEE802.11ax MU-OFDMA message exchanges. The order in which the instructions are discussed does not limit the order in which other example embodiments implement the instructions unless otherwise specifically stated. Additionally, in some embodiments the instructions are implemented concurrently.

A first example instruction set begins in 302—generate a reserve slot time trigger frame to a selected set of user station devices (STAs). Next, in 304—transmit the reserve slot time trigger frame over a physical media to the selected set of STAs and exchange traffic with the selected set of STAs over the physical media. Then in 306—wherein the reserve slot time trigger frame is configured to reserve a slot time on the physical media. Next in 308—wherein the controller is configured to transmit a burst of downlink (DL) traffic from the AP device during the slot time. Then in 310—transmit a configuration frame to configure the selected set of STAs. Next, in 312—wherein the configuration frame includes an UL backoff time field for scheduling a particular time for UL traffic to be transmitted by each one of the selected STAs, and includes an arbitration inter-frame spacing (AIFS) time and a random backoff time set to zero. Then in 314—wherein the controller is configured to set a fixed AIFS time unique to each of the selected STAs. Next, in 316—wherein the controller is configured to set the AIFS time for each of the selected STAs independent of a traffic type.

Additional example embodiments for implementing these instructions are now discussed in the context of the following Figures.

Figure 4:
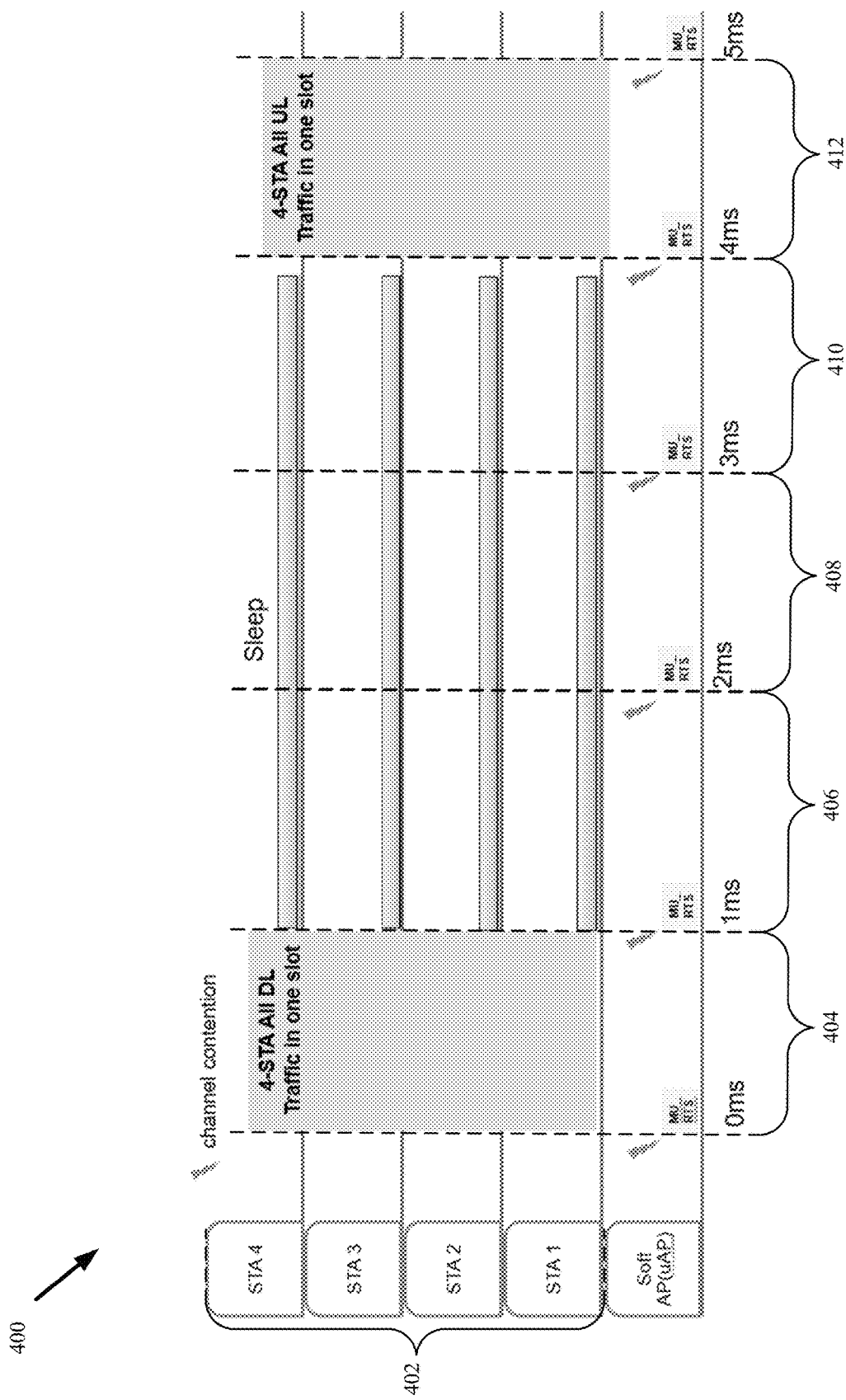
FIG. 4 represents an example timing diagram of a set of channel TXOP slots generated by the AP device using MU-RTS/CTS trigger frames for a selected set of 4 STAs.

FIG. 4 represents an example 400 timing diagram of a set of channel TXOP slots 404-412 generated by the AP device using MU-RTS/CTS trigger frames for a selected set of 4 STAs 402.

As introduced above, the AP device can generate a set of channel TXOP slots using MU-RTS/CTS trigger frames for a selected set of STAs. This can be effected by configuring the AP device to transmit 11ax MU-RTS trigger frames at a predefined rate to partition the physical media airtime into a set of "TXOP slots", for the selected set of STAs (e.g. STA1, STA2, STA3 and STA4).

The AP device in some example embodiments is a software defined access point (Soft-AP) embedded within a computer or microcontroller.

For example, the AP device can be configured to periodically send MU-RTS trigger frames every 1 ms, once the physical media becomes idle from a previous flax message exchange (i.e. send a first MU-RTS during the channel contention time). The MU-RTS trigger frame is a variation defined by 11ax, and carries/contains per-STA information for the selected set of STAs. Each selected STA will respond to the MU-RTS frame by sending a CTS frame with appropriate pre-synchronizations. The CTS frame is same as an UL-OFDMA STA CTS frame.

The MU-RTS trigger frame in some example embodiments is a multi-user orthogonal frequency-division multiple access (MU-OFDMA) modulated trigger frame, while in other example embodiments the MU-RTS trigger frame is a single-user orthogonal frequency-division multiple access (SU-OFDMA) modulated trigger frame, since they both are similar.

Since the MU-RTS/CTS frames are decodable by both 11ax and non-11ax APs and STAs whether in-BSS or OBSS (i.e. since they are similar to SU RTS/CTS frames), those in-BSS that were not selected and any other OBSS devices will not transmit within the TXOP slots created by the AP device in response to the MU-RTS trigger frames sent by the AP. As a result collisions will be avoided with these non-selected and other OBSS devices.

During each slot, the AP device in various example embodiments may: DL data to 11ax STAs; DL data to non-11ax STAs; 11ax STA sends UL data; non-11ax STA sends UL data; or no data to/from any STA. At the beginning of each slot, normal channel contention is still conducted, thereby giving a fair chance of channel access to OBSS STAs.

Figure 5:
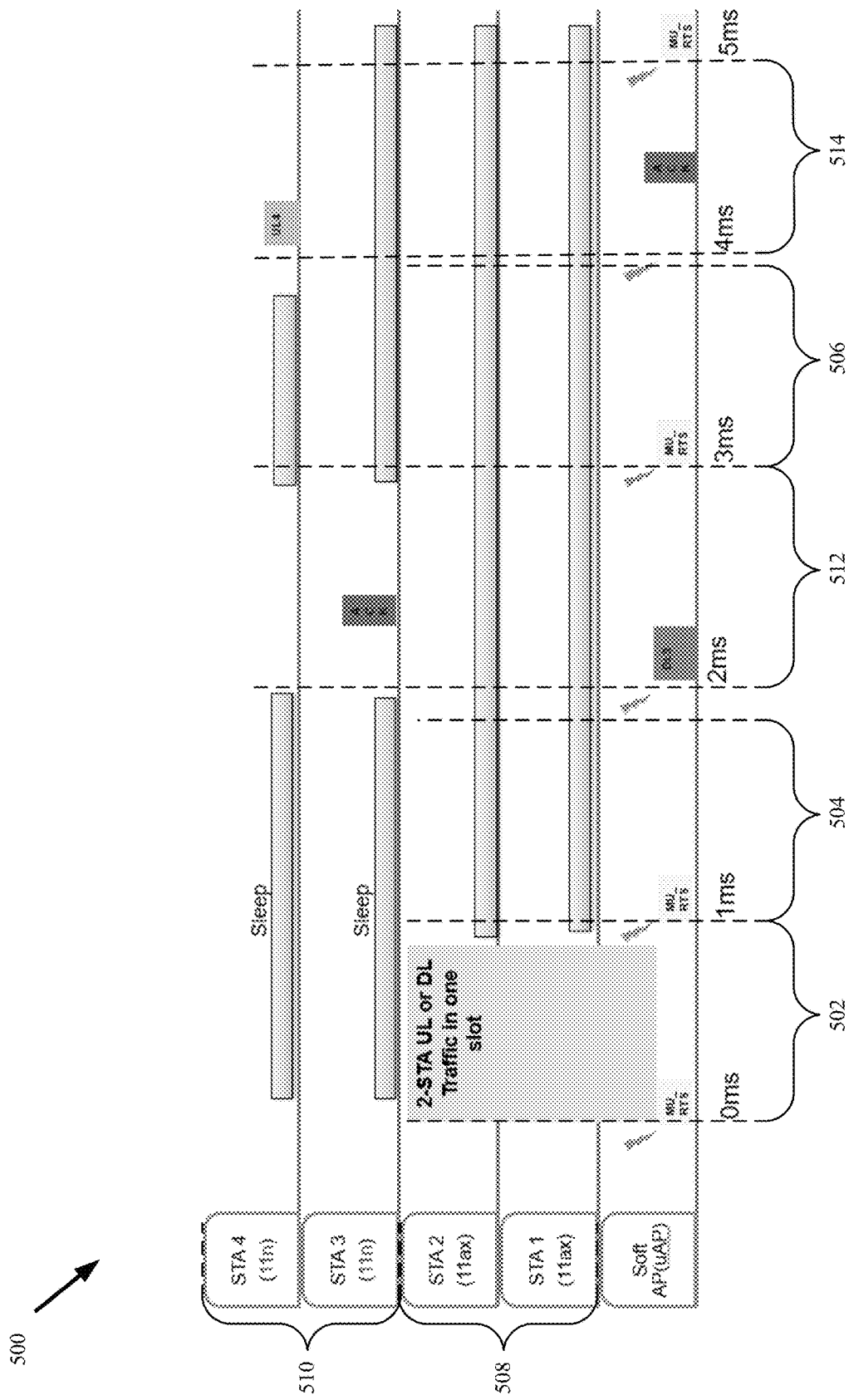
FIG. 5 represents an example timing diagram of how the example AP device can generate a set of channel TXOP slots using MU-RTS/CTS trigger frames for a selected set of 2 STAs while also exchanging traffic between other STAs that were not selected in other slots.

FIG. 5 represents an example 500 timing diagram of how the example AP device can generate a set of channel TXOP slots 502, 504, 506 using MU-RTS/CTS trigger frames for a selected set of 2 STAs 508 while also exchanging traffic between other STAs 510 that were not selected in a BSS or that are outside the basic service set (OBSS) in other slots 512, 514.

Figure 6:
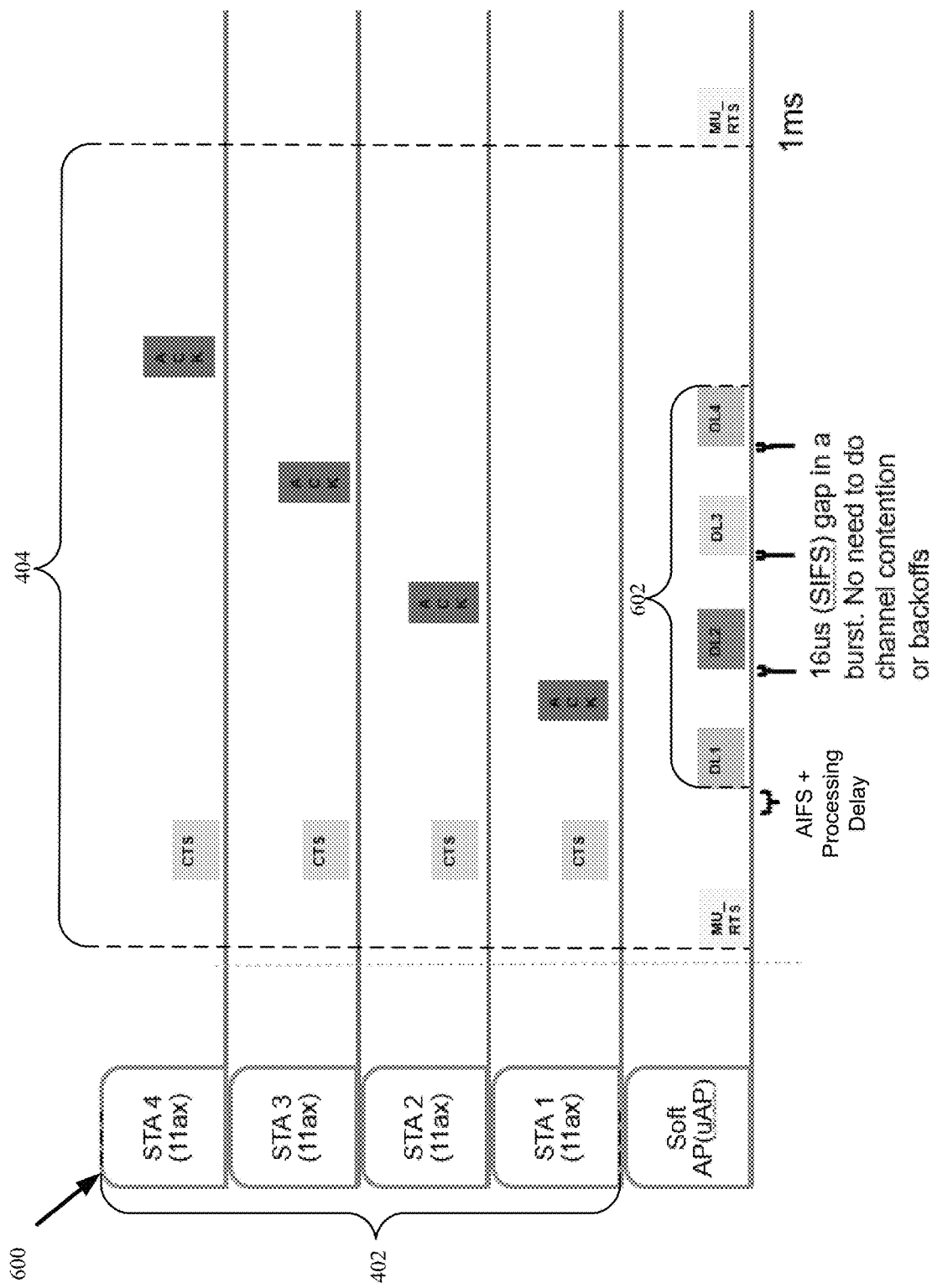
FIG. 6 represents an example timing diagram of how the example AP device can transmit a burst of DL traffic to the selected set of 4 STAs in just one channel TXOP slot.

FIG. 6 represents an example 600 timing diagram of how the example AP device can transmit a burst of DL traffic 602 to the selected set of 4 STAs 402 in just one channel TXOP slot 404.

In various example embodiments for DL, when the AP device has Tx data for multiple STAs, the AP device puts the Tx data in single Tx queue for bursting transmission (SIFS gap), similar to DL-OFDMA, without additional contention delay times for each STA due to the MU-RTS/CTS created slots. The burst of downlink (DL) traffic includes a set of data packets separately addressed to the selected STAs.

To minimize network latency, the AP device spaces the DL traffic to each of the selected STAs by a time that can be less than an IEEE802.11ax standard contention period and/or less than an IEEE802.11ax standard SIFS period.

Figure 7:
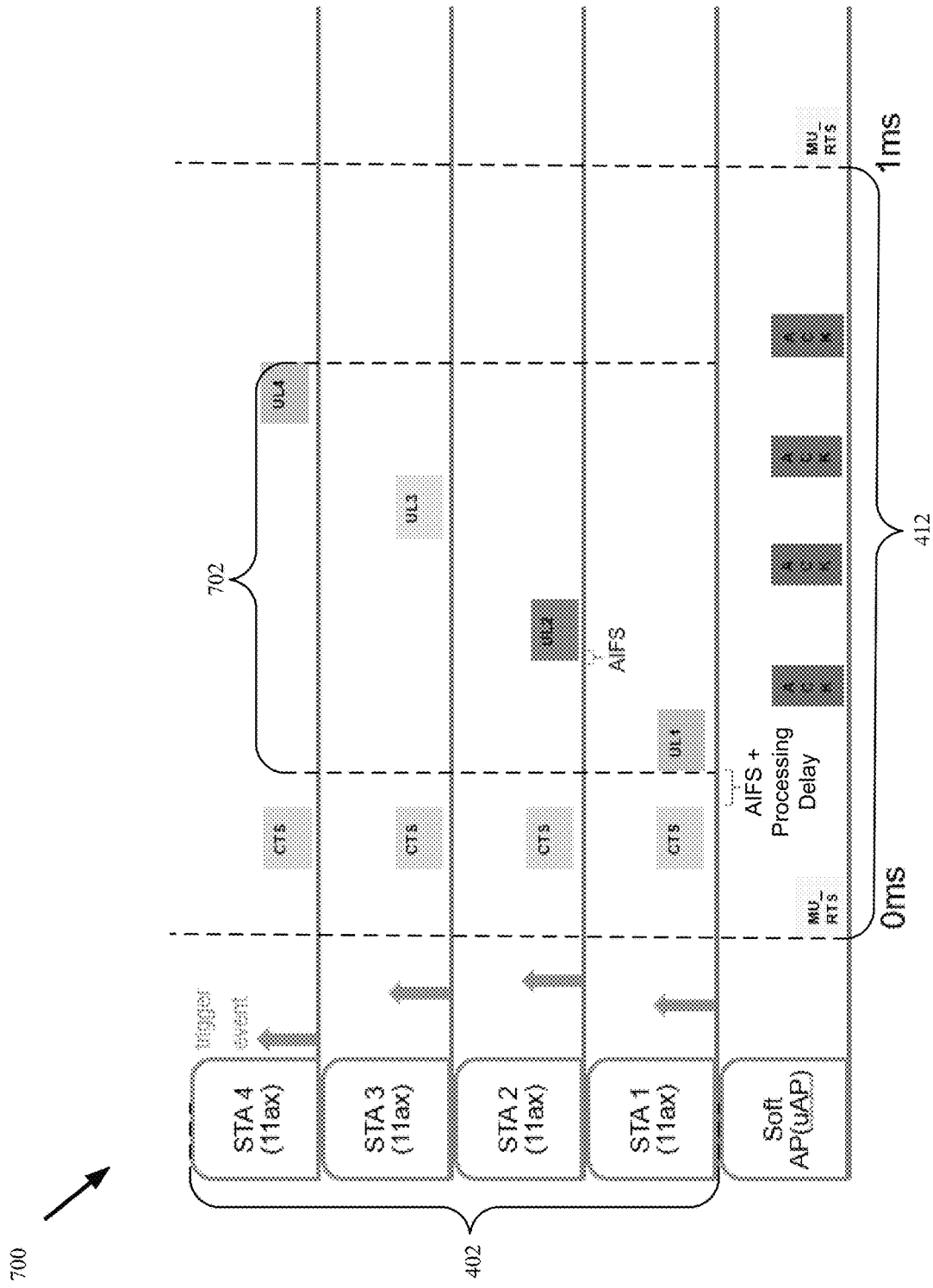
FIG. 7 represents an example timing diagram of how the example AP device can receive a burst of UL traffic from the selected set of 4 STAs in just one channel TXOP slot.

FIG. 7 represents an example 700 timing diagram of how the example AP device can receive a burst of UL traffic 702 from the selected set of 4 STAs 402 in just one channel TXOP slot 412 by defining non-overlapping wait times using IEEE802.11ax arbitration inter-frame spacing (AIFS) defined by STA and not by access category.

In the IEEE802.11ax standard, AIFS times are a method of prioritizing different transmissions, typically based on a frame's access category (e.g. video, audio, gaming, email, SMS, etc.). Access categories having smaller "AIFS intents" are transmitted before Access categories having larger "AIFS intents". However, discussed here is a method for defining AIFS times by STAs.

The configuration frame sent by the AP device to the STAs includes an UL backoff time field for scheduling a particular time for UL traffic to be transmitted by each one of the selected STAs. The backoff time field can include an arbitration inter-frame spacing (AIFS) time and a random backoff time. To minimize network latency and perform scheduling, the AP device sets the random backoff time to zero, and sets a fixed AIFS time unique to each of the selected STAs. The AIFS time for each of the selected STAs can be independent of a traffic type (e.g. video data, gaming data, audio data, email data, and sensor data).

Discussed another way such as between the AP device and two selected STAS (e.g. a first STA and a second STA), the configuration frame sent by the AP device assigns a first time to transmit uplink (UL) traffic to the first STA and a second time to transmit UL traffic to the second STA, wherein the first time is different from the second time.

The first and second times are based on a trigger event received from one of the selected STAs. FIG. 7 shows and example trigger event as the "blue arrows". In some example embodiments these trigger events correspond to a button press on a game controller. In various example embodiments the first and second times can be calculated based on an earliest trigger event from a set of trigger events received from the selected STAs. The trigger events may or may not be sent by one of the selected STAs during an individual slot time.

Thus in various example embodiments for UL, within the TXOP slots reserved by the AP device using MU-RTS, the AP device sets different non-overlapping AIFS times for each of the different STAs, including the AP's own AIFS window for Tx data DL as described above.

If the UL traffic is more latency sensitive than the DL traffic, then the AIFS times for the STAs may be smaller than the AIFS time for the AP's DL traffic. For example: AIFS=SIFS+n*slot, STA1~4 may take n=1~4 respectively; for DL transmissions by the AP: AIFS=SIFS+5*slot. In some example embodiments, the AP device may adjust the AIFS values so that for specific slots DL traffic from the AP device has a higher priority (e.g. smaller AIFS time for the AP device than for the STAs). The AP device may also dynamically adjust the AIFS times for all of the selected STAs on a slot by slot basis. In some example embodiments, the AP device may rotate different STA's AIFS order (e.g. the "n"-number in above equations) periodically over time to better equalize channel access priority for each of the STAs.

Thus the UL traffic from to each of the selected STAs may be spaced by a time that is less than either an IEEE802.11ax standard contention period or SIFS period, depending upon the application.

In some example embodiments, the AP device uses higher level frame exchanges to set each of the selected STAs AIFS time windows. These different AIFS values for different devices is then used to create an ordering of transmissions. Since the AP device sets different AIFS times for different STAs, there are no collisions and the SIFS and/or contention time can be dramatically reduced, almost to be equivalent to true MU-OFDMA. Furthermore, by adjusting the AIFS times to small enough values depending upon a particular type of data being sent, or for other reasons, airtime efficiency can be further improved.

Figure 8:
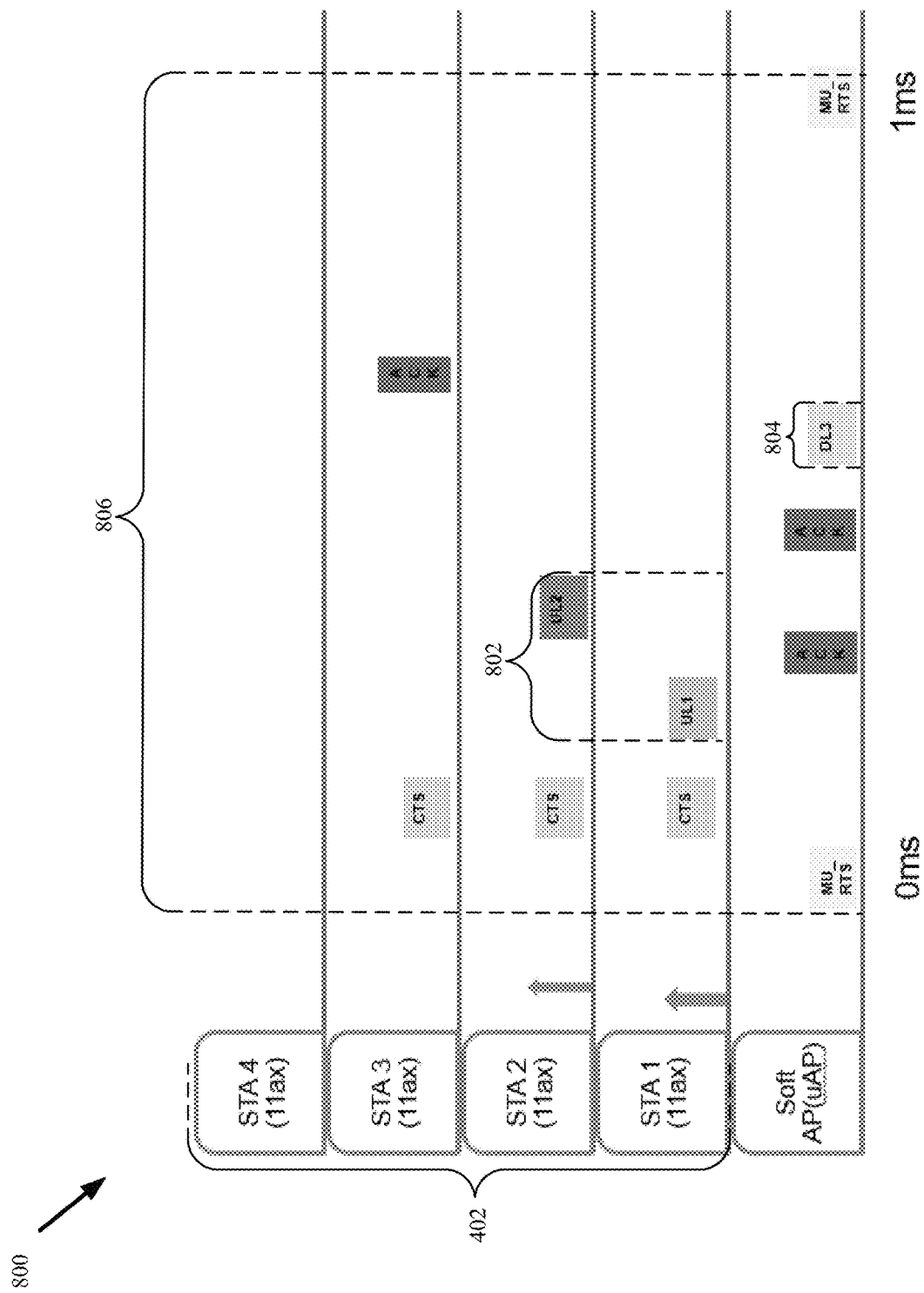
FIG. 8 represents an example timing diagram of how the example AP device can both receive a burst of UL traffic from two of the selected set of 4 STAs and transmit DL traffic to at least one of the selected set of 4 STAs in just one channel TXOP slot.

FIG. 8 represents an example 800 timing diagram of how the example AP device can both receive a burst of UL traffic 802 from two of the selected set of 4 STAs 402 and transmit DL traffic 804 to at least one of the selected set of 4 STAs 402 in just one channel TXOP slot 806.

Figure 9:
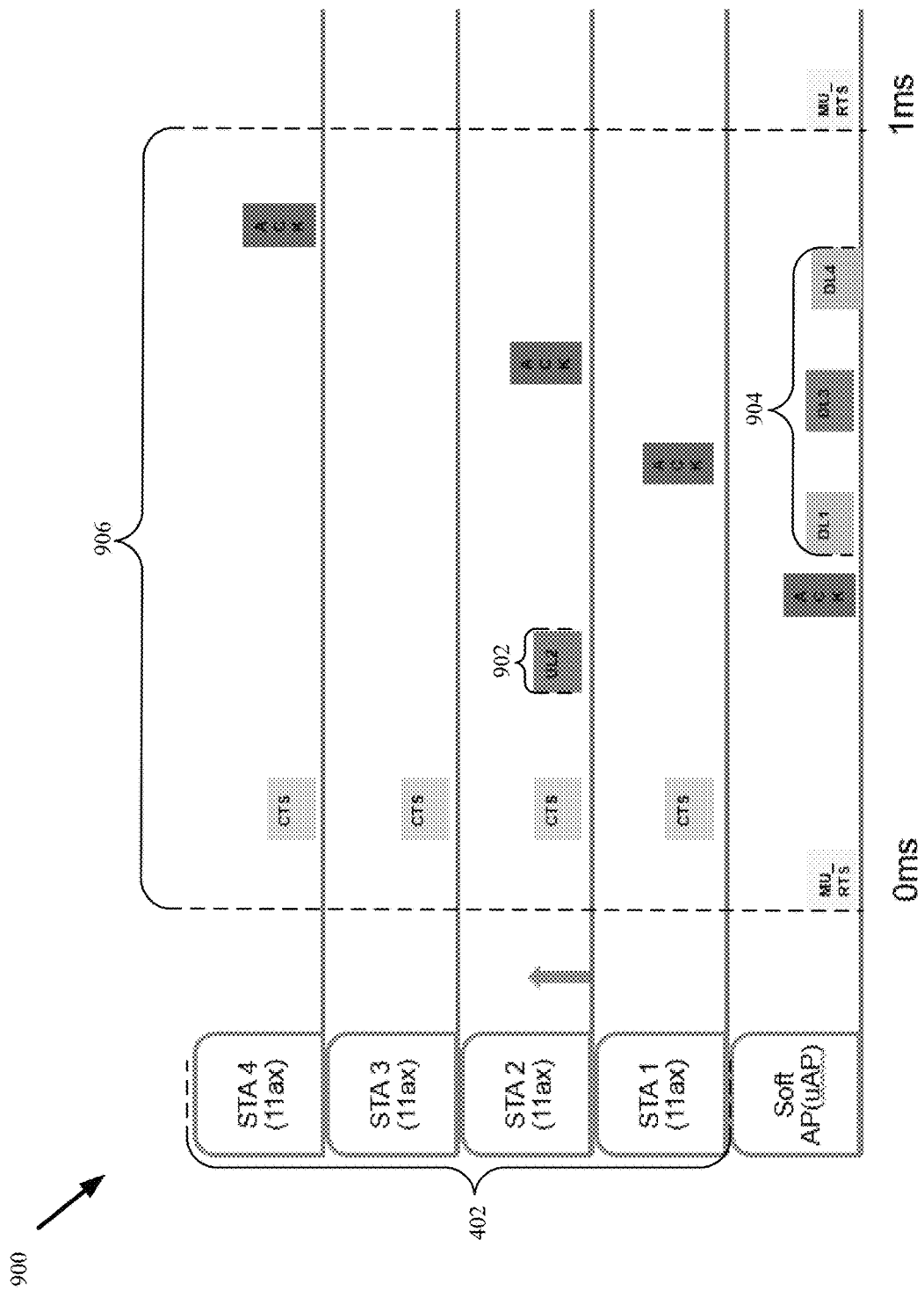
FIG. 9 represents an example timing diagram of how the example AP device can both receive UL traffic from at least one of the selected set of 4 STAs and transmit a burst of DL traffic to at least three of the selected set of 4 STAs in just one channel TXOP slot.

FIG. 9 represents an example 900 timing diagram of how the example AP device can both receive UL traffic 902 from at least one of the selected set of 4 STAs 402 and transmit a burst of DL traffic 904 to at least three of the selected set of 4 STAs 402 in just one channel TXOP slot 906.

Figure 10:
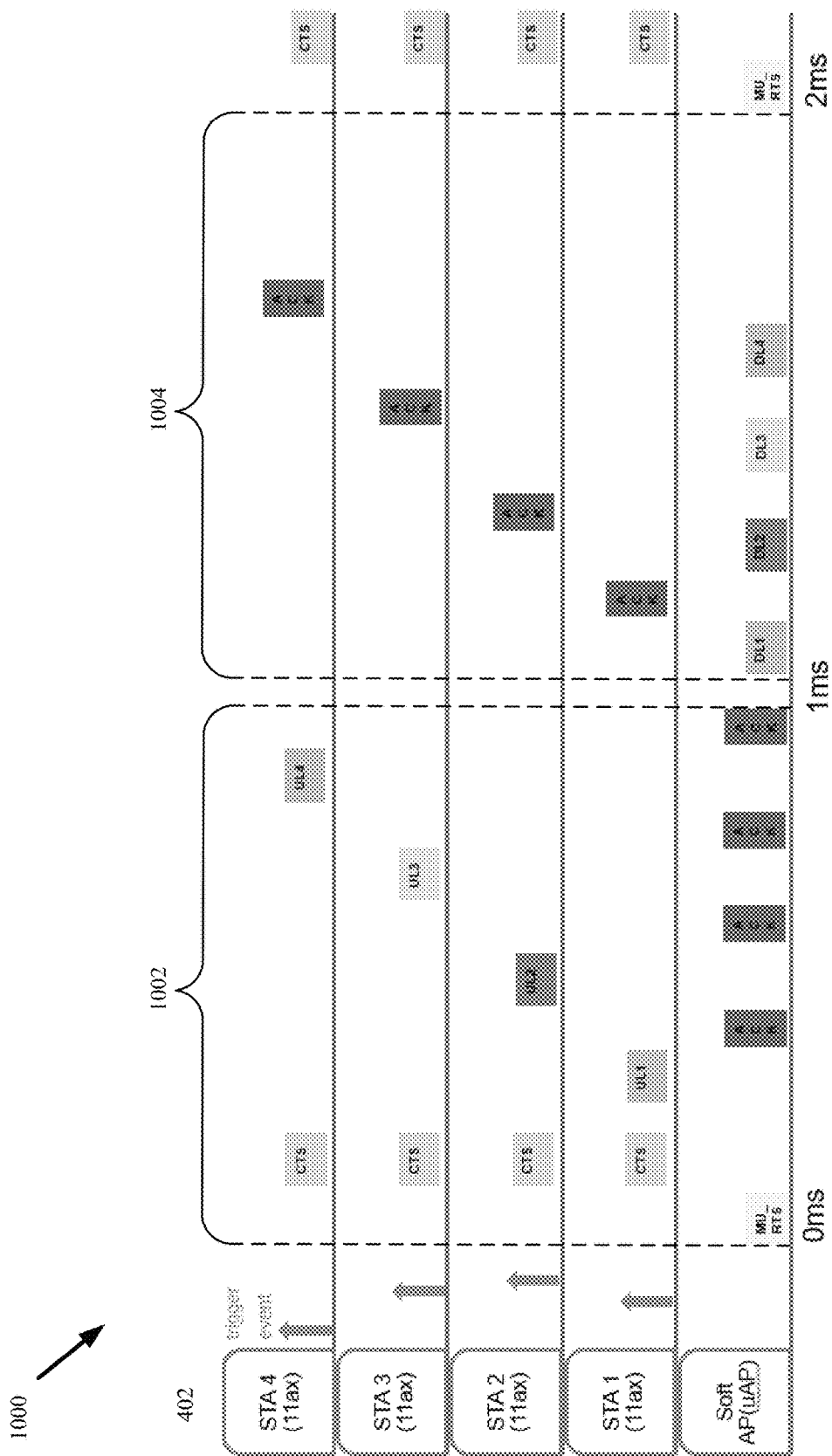
FIG. 10 represents an example timing diagram of how the example AP device can both receive a burst of UL traffic from the selected set of 4 STAs and transmit a burst of DL traffic to the selected set of 4 STAs in a time greater than just one channel TXOP slot.

FIG. 10 represents an example 1000 timing diagram of how the example AP device can both receive a burst of UL traffic from the selected set of 4 STAs 402 and transmit a burst of DL traffic to the selected set of 4 STAs 402 in a time greater than just one channel TXOP slot 1002.

Since in some example embodiments, either or both DL and UL traffic may exceed the time provided during only one slot, this example 1000 shows where all 4 STAs have data in both DL and UL at a same time but UL has higher transmission priority. As a result, the UL burst begins in slot 1002 but then enters an additional time period 1004 that is not defined as a TXOP slot. Thus the DL traffic from AP device goes out in burst without considering 1 ms boundary created by TXOP slot 1002.

When the UL traffic is transmitted first, then the DL traffic burst may start after UL traffic, but may not stop at 1 ms boundary (e.g. 4 UL packets requires ~700 us, after which AP device starts to burst all DL packets in another 600~700 us, therefore the next MU-RTS may be sent 1~2 ms from previous MU-RTS).

To resolve this, in some example embodiments, the AP device can block/limit its own DL traffic if the UL from the STAs exceeds a predetermined time (e.g. 700 µs) or alternatively based on a size of the DL data to be transmitted.

In other example embodiments, the AP device can either limit a particular STAs' UL traffic (e.g. using OWL) or reduce a number of STAs that can send UL data, so that the AP device can transmit its DL data.

Figure 11:
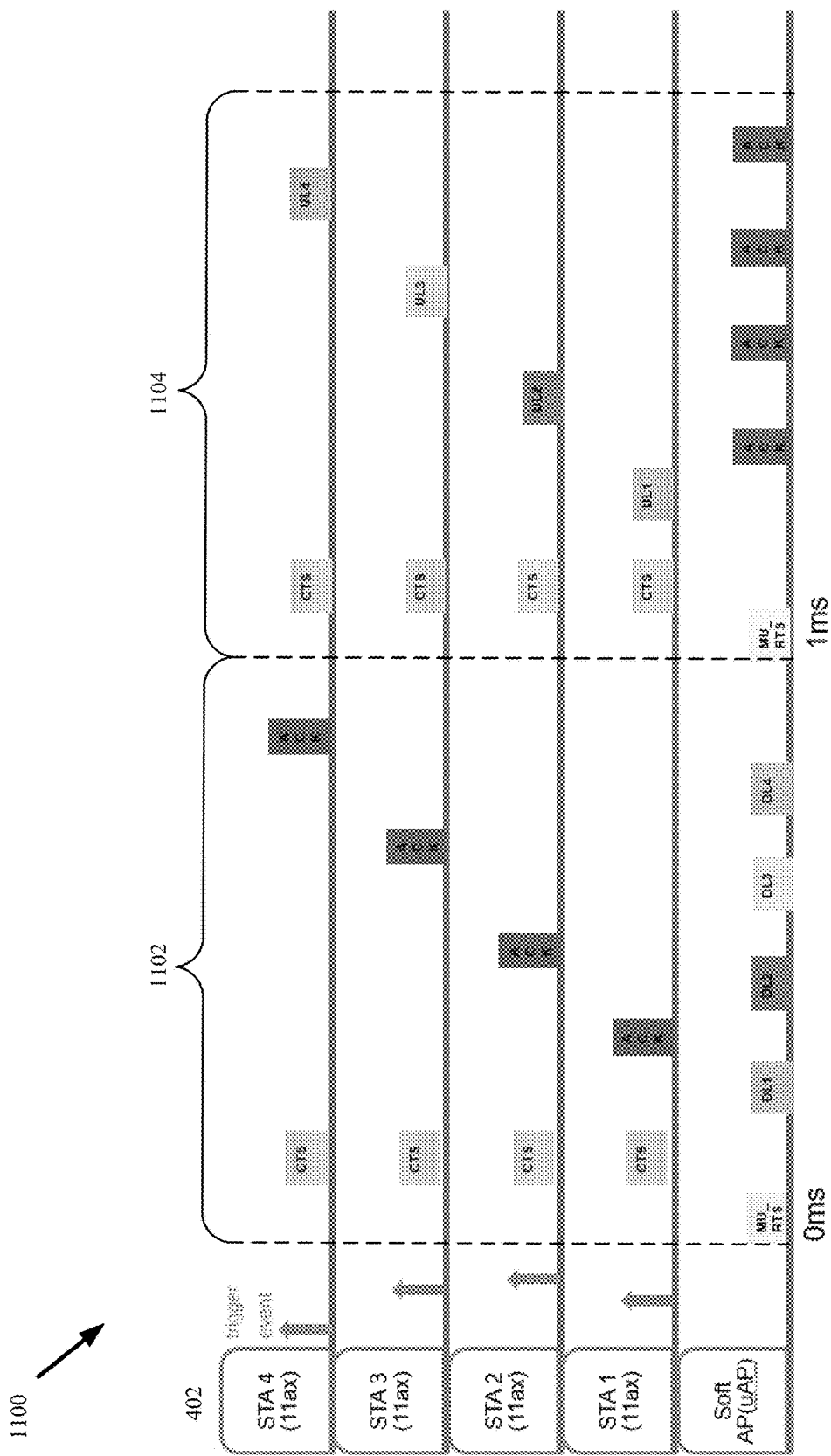
FIG. 11 represents an example timing diagram of how the example AP device can both transmit a burst of DL traffic to the selected set of 4 STAs in a first TXOP slot, and receive a burst of DL traffic from the selected set of 4 STAs in a second TXOP slot.

FIG. 11 represents an example 1100 timing diagram of how the example AP device can both transmit a burst of DL traffic to the selected set of 4 STAs 402 in a first TXOP slot 1102, and receive a burst of DL traffic from the selected set of 4 STAs 402 in a second TXOP slot 1104.

In this example 1100 all 4 STAs have data in both DL and UL at a same time but DL has higher transmission priority. Here the AP device's DL packets have a higher priority (e.g. shorter AIFS time) in the slot, and the AP device is configured to immediately send a next MU-RTS in 1 ms, after bursting the DL packets to the selected STAs.

In another example embodiment, before sending the MU-RTS trigger frame, the AP device may first check how many STAs have DL traffic, and in response change which of the STAs receive the MU-RTS trigger frame. For example: if all 4 STAs have DL traffic, then the AP device can send the MU-RTS to only one STA; if 3 STAs have DL traffic, then the AP device sends the MU-RTS to 2 STAs; and so on, so as to guarantee all DL+UL traffic stays within a single 1 ms created TXOP slot. Alternatively, if DL+UL traffic rates are lower, we can also adjust the number of STAs that receive the MU-RTS accordingly. However, before the AP device sends the set of MU-RTS frames and after the AP device stops sending the MU-RTS frames, the AP device is configured to use normal 11ax random backoff times in addition to normal AIFS times for all STAs.

Applications of the AP device just discussed include where the STAs are a set of game controllers that benefit from extremely short latencies, particularly within a single BSS. Use cases that require low latency, e.g. for gaming consoles communicating with gaming controllers (Joysticks, speakers, etc) would benefit.

This AIFS based UL traffic technique is also suitable for customers who want their unique and closed-system solutions, where both sides (software and hardware) are fully controlled. Also in applications having SU-OFDMA STAs the AP device control techniques discussed still enable a latency reduction by using MU-RTS trigger frame and AIFS assignment techniques, such that together these techniques can achieve an airtime efficiency close to MU-OFDMA.

Regarding the instructions discussed earlier in this specification, various other devices, in addition to the AP device just discussed, can host these instructions. Such systems can include an input/output data interface, a processor, a storage device, and a non-transitory machine-readable storage medium. The machine-readable storage medium includes the instructions which control how the processor receives input data and transforms the input data into output data, using data within the storage device. The machine-readable storage medium in an alternate example embodiment is a non-transitory computer-readable storage medium. In other example embodiments the set of instructions described above can be implemented either using logic gates, application specific chips, firmware, as well as other hardware forms.

In some example embodiments the set of instructions described above are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless Access Point (AP) device, within a wireless local area network (WLAN), comprising:
a controller configured to generate a reserve slot time trigger frame to a selected set of user station devices (STAs);
wherein the controller is configured to be coupled to an antenna;
wherein the antenna is configured to transmit the reserve slot time trigger frame over a physical media to the selected STAs and exchange traffic with the selected STAs over the physical media;
wherein the reserve slot time trigger frame is configured to reserve a slot time on the physical media;
wherein the selected STAs include a first STA and a second STA;
wherein the controller configured to transmit a configuration frame to configure the selected STAs;
wherein the configuration frame assigns a first time for transmitting uplink (UL) traffic to the first STA and a second time for transmitting UL traffic to the second STA; and
wherein the first and second times are calculated based on a trigger event received from one of the selected STAs.

2. The device of claim 1:
wherein the reserve slot time trigger frame is a MU_RTS trigger frame compatible with an IEEE802.11ax standard.

3. The device of claim 1:
wherein the slot time is a TXOP slot time compatible with an IEEE802.11ax standard.

4. The device of claim 1:
wherein the controller configured to transmit a configuration frame to configure the selected STAs;
wherein the configuration frame includes an UL backoff time field for scheduling a particular time for UL traffic to be transmitted by each one of the selected STAs; and
wherein the backoff time field includes a random backoff time.

5. The device of claim 4:
wherein the random backoff time is set to zero.

6. The device of claim 4:
further comprising an arbitration inter-frame spacing (AIFS) time;
wherein the controller is configured to set a fixed AIFS time unique to each of the selected STAs.

7. The device of claim 6:
wherein the controller is configured to set the AIFS time for each of the selected STAs independent of a traffic type.

8. The device of claim 1:
wherein the first time is different from the second time.

9. The device of claim 1:
wherein the first and second times are calculated based on an earliest trigger event from a set of trigger events received from the selected STAs.

10. The device of claim 1:
wherein the first and second times are calculated based on a trigger event sent by one of the selected STAs during the slot time.

11. The device of claim 1:
wherein the DL traffic to each of the selected STAs is spaced by a time that is less than either an IEEE802.11ax standard contention period or SIFS period.

12. The device of claim 4:
wherein the UL traffic from each of the selected STAs is spaced by a time that is less than either an IEEE802.11ax standard contention period or SIFS period.

13. The device of claim 1:
wherein the antenna is configured to transmit the reserve slot time trigger frame to an additional set of STAs and exchange traffic with the additional set of STAs; and
wherein the controller configured to exchange traffic with the additional set of wireless devices outside of the slot time.

14. The device of claim 1:
wherein the AP device is a software defined access point (Soft-AP) embedded within a computer or microcontroller.

15. The device of claim 1:
wherein the reserve slot time trigger frame is a request to send trigger frame (MU_RTS).

16. The device of claim 1:
wherein the selected STAs are responsive to a fixed UL backoff time field for scheduling a particular time for UL traffic to be transmitted by each one of the selected STAs; and
wherein the backoff time field includes a random backoff time.

17. The device of claim 1:
wherein the selected STAs include a first STA and a second STA; and
wherein the selected STAs include a fixed first time to transmit uplink (UL) traffic to the first STA and a fixed second time to transmit UL traffic to the second STA.

18. The device of claim 1:
wherein the selected STAs are responsive to a fixed arbitration inter-frame spacing (AIFS) time for scheduling a particular time for UL traffic to be transmitted by each one of the selected STAs.

19. The device of claim 1:
wherein the reserve slot time trigger frame is configured to reserve the slot time in one channel on the physical media;
wherein the controller is configured to transmit a burst of downlink (DL) traffic from the AP device in the one channel during the slot time;
wherein the burst of DL traffic includes a set of data packets; and
wherein each one of the data packets is separately addressed to just one of the selected STAs.

20. A wireless Access Point (AP) device, within a wireless local area network (WLAN), comprising:
a controller configured to generate a reserve slot time trigger frame to a selected set of user station devices (STAs);
wherein the controller is configured to be coupled to an antenna;
wherein the antenna is configured to transmit the reserve slot time trigger frame over a physical media to the selected STAs and exchange traffic with the selected STAs over the physical media;
wherein the reserve slot time trigger frame is configured to reserve a slot time on the physical media; and
wherein the selected STAs are responsive to a fixed UL backoff time field for scheduling a particular time for UL traffic to be transmitted by each one of the selected STAs.

* * * * *